United States Patent [19]

Jost

[11] 4,276,213
[45] Jun. 30, 1981

[54] PROCESS FOR THE COLORATION OF ORGANIC MATERIAL OF HIGH MOLECULAR WEIGHT IN THE MELT WITH ANTHRAQUINONE DYES

[75] Inventor: Max Jost, Oberwil, Switzerland

[73] Assignee: Ciba-Geigy Corporation, Ardsley, N.Y.

[21] Appl. No.: 49,820

[22] Filed: Jun. 18, 1979

[30] Foreign Application Priority Data

Jun. 29, 1978 [CH] Switzerland .................. 7100/78

[51] Int. Cl.³ ............... C07C 103/75; C08K 5/08
[52] U.S. Cl. ............................ 260/40 R; 260/377
[58] Field of Search ............... 260/377, 381; 8/39 A, 8/39 C; 266/40 R

[56] References Cited

U.S. PATENT DOCUMENTS

| | | | |
|---|---|---|---|
| 3,653,800 | 4/1972 | Blackwell | 8/39 C |
| 3,715,373 | 2/1973 | Andrews | 260/377 |
| 3,720,693 | 3/1973 | Peters et al. | 260/40 R |
| 3,741,720 | 6/1973 | Hederich et al. | 260/377 |

FOREIGN PATENT DOCUMENTS

| | | | |
|---|---|---|---|
| 755377 | 1/1971 | Belgium | 260/377 |
| 1493841 | 9/1967 | France | 260/377 |
| 2329701 | 5/1977 | France . | |
| 2369314 | 5/1978 | France . | |
| 1282211 | 7/1972 | United Kingdom . | |

Primary Examiner—Patrick Garvin
Assistant Examiner—Raymond K. Covington
Attorney, Agent, or Firm—Harry Falber

[57] ABSTRACT

The invention discloses a process for the coloration of organic material of high molecular weight, wherein the colorant is a compound of the formula

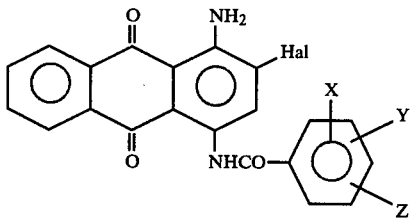

wherein Hal represents a chlorine or bromine atom, X represents a hydrogen or halogen atom, an alkyl or alkoxy group of 1 to 6 carbon atoms, an alkoxycarbonyl group of 2 to 7 carbon atoms, a phenyl group or a phenoxy group which is unsubstituted or substituted by chlorine atoms or methyl groups, and Y and Z represent hydrogen or halogen atoms or methyl groups.

12 Claims, No Drawings

PROCESS FOR THE COLORATION OF ORGANIC MATERIAL OF HIGH MOLECULAR WEIGHT IN THE MELT WITH ANTHRAQUINONE DYES

It is known from Swiss Pat. No. 533,660 that 1-amino-2-halogen-4-p-toluenesulfonylaminoanthraquinones can be used for the colouration of linear polyesters in the melt. However, the reddish violet colourations obtained are lacking in tinctorial strength and are only moderately lightfast.

It has now been found that reddish violet colourations of excellent purity and lightfastness are obtained in the colouration of polyesters in the melt by using, as colourants, anthraquinone compounds of the formula

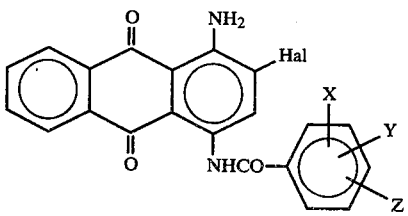

wherein Hal represents a chlorine or bromine atom, X represents a hydrogen or halogen atom, an alkyl or alkoxy group of 1 to 6 carbon atoms, an alkoxycarbonyl group of 2 to 7 carbon atoms, a phenyl group or a phenoxy group which is unsubstituted or substituted by chlorine atoms or methyl groups, and Y and Z represent hydrogen or halogen atoms or methyl groups.

Particularly interesting colourants are those of the formula

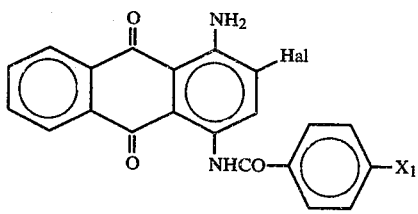

wherein Hal represents a chlorine or bromine atom and $X_1$ represents a hydrogen or chlorine atom, and especially those wherein Hal represents a bromine atom.

The colourants of this invention can be obtained by known methods. The manufacture of 1-amino-2-chloro- and 1-amino-2-bromo-4-benzoylaminoanthraquinone is described in U.S. Pat. No. 3,715,373, Example 1. In addition, 1-amino-2-bromo-4-benzoylaminoanthraquinone can be obtained in very good quality by reaction of 1,4-diamino-2-bromoanthraquinone with benzoyl chloride in the presence of a nitrogen base and a solvent under mild conditions.

1-amino-2-bromo-4-benzoylaminoanthraquinone can also be obtained by the process described in Swiss patent specification 505 784 by bromination of 1-amino-4-benzoylaminoanthraquinone in a mixture of nitrobenzene and water.

Examples of colourants of the formula (I) are:
1-amino-2-chloro-4-(2'-methoxybenzoylamino)-anthraquinone
1-amino-2-chloro-4-(4'-methoxybenzoylamino)-anthraquinone
1-amino-2-chloro-4-(2'-phenoxybenzoylamino)-anthraquinone
1-amino-2-chloro-4-(4'-phenoxybenzoylamino)-anthraquinone
1-amino-2-chloro-4-(4'-phenylbenzoylamino)-anthraquinone
1-amino-2-chloro-4-(4'-methoxycarbonylbenzoylamino)-anthraquinone
1-amino-2-chloro-4-benzoylaminoanthraquinone
1-amino-2-chloro-4-(2'-fluorobenzoylamino)-anthraquinone
1-amino-2-chloro-4-(2'-chlorobenzoylamino)-anthraquinone
1-amino-2-chloro-4-(3'-chlorobenzoylamino)-anthraquinone
1-amino-2-chloro-4-(4'-chlorobenzoylamino)-anthraquinone
1-amino-2-chloro-4-(4'-bromobenzoylamino)-anthraquinone
1-amino-2-chloro-4-(2',4'-dichlorobenzoylamino)-anthraquinone
1-amino-2-chloro-4-(2',5'-dichlorobenzoylamino)-anthraquinone
1-amino-2-chloro-4-(3',5'-dichlorobenzoylamino)-anthraquinone
1-amino-2-chloro-4-(2',6'-dichlorobenzoylamino)-anthraquinone
1-amino-2-chloro-4-(4'-methylbenzoylamino)-anthraquinone
1-amino-2-chloro-4-(4'-t-butylbenzoylamino)-anthraquinone
1-amino-2-chloro-4-(2'-chloro-6'-methylbenzoylamino)-anthraquinone
1-amino-2-chloro-4-(3'-chloro-4'-methylbenzoylamino)-anthraquinone
1-amino-2-bromo-4-(2'-methoxybenzoylamino)-anthraquinone
1-amino-2-bromo-4-(4'-methoxybenzoylamino)-anthraquinone
1-amino-2-bromo-4-(2'-phenoxybenzoylamino)-anthraquinone
1-amino-2-bromo-4-(4'-phenoxybenzoylamino)-anthraquinone
1-amino-2-bromo-4-(4'-phenylbenzoylamino)-anthraquinone
1-amino-2-bromo-4-(4'-methoxycarbonylbenzoylamino)-anthraquinone
1-amino-2-bromo-4-benzoylaminoanthraquinone
1-amino-2-bromo-4-(2'-fluorobenzoylamino)-anthraquinone
1-amino-2-bromo-4-(2'-chlorobenzoylamino)-anthraquinone
1-amino-2-bromo-4-(3'-chlorobenzoylamino)-anthraquinone
1-amino-2-bromo-4-(4'-chlorobenzoylamino)-anthraquinone
1-amino-2-bromo-4-(4'-bromobenzoylamino)-anthraquinone
1-amino-2-bromo-4-(2',4'-dichlorobenzoylamino)-anthraquinone
1-amino-2-bromo-4-(2',5'-dichlorobenzoylamino)-anthraquinone
1-amino-2-bromo-4-(3',5'-dichlorobenzoylamino)-anthraquinone
1-amino-2-bromo-4-(2',6'-dichlorobenzoylamino)-anthraquinone
1-amino-2-bromo-4-(4'-methylbenzoylamino)-anthraquinone
1-amino-2-bromo-4-(4'-t-butylbenzoylamino)-anthraquinone 1-amino-2-bromo-4-(2'-chloro-6'-methylbenzoylamino)-
  anthraquinone
1-amino-2-bromo-4-(3'-chloro-4'-methylbenzoylamino)-
  anthraquinone The 1-amino-2-halogen-4-benzoylaminoanthraquinones of the formula I are suitable for the colouration of organic compounds of high molecular weight in the melt, especially thermoplastics.

To obtain special effects, for example improved solubility in thermoplastics, it can be advantageous to mix colourants of this invention with one another or with other suitable colourants, or to use synthesis mixtures obtained by appropriate choice of different starting materials.

The colourants of the present invention, which are soluble in organic media, are preferably suitable for the colouration of spinnable polymers in the melt, in particular of linear polyesters.

Suitable linear polyesters are in particular those which are obtained by polycondensation of terephthalic acid or an ester thereof with a glycol of the formula HO—$(CH_2)_n$—OH, in which n is an integer from 2 to 10, or with 1,4-di(hydroxymethyl)cyclohexane, or by polycondensation of a glycol ether of a hydroxybenzoic acid, for example p-(β-hydroxyethoxy)-benzoic acid. The term "linear polyesters" also comprises copolyesters which are obtained by partial replacement of terephthalic acid by another dicarboxylic acid and/or by partial replacement of glycol by another diol. However, preferred linear polyesters are polyethylene terephthalates.

The linear polyesters to be coloured are preferably homogeneously mixed with the colourant in the form of powders, chips or granules. This can be accomplished for example by coating the polyester particles with the finely divided colourant powder or by treating the polyester particles with a solution or dispersion of the colourant in an organic solvent and subsequently removing this latter.

Finally, the substrate to be coloured can also be added direct to the polyester melt.

Depending on the desired colour strength, the ratio of colourant to polyester can vary within wide limits. In general, it is advisable to use 0.01 to 2 parts of colourant to 100 parts of polyester.

The treated polyester particles are fused by known methods in an extruder and pressed to objects, in particular sheets or filaments, or cast to boards.

Level and intensely coloured objects of excellent lightfastness are obtained. The coloured fibres obtained according to the invention are distinguished, moreover, by outstanding wetfastness and fastness to dry cleaning as well as by excellent fastness to rubbing after thermofixation and by good fiber viscosity values.

A particular advantage of the colourants of the invention consists in the fact that they dissolve in the polyester melt, so that substantially clearer colourations are obtained than when using insoluble pigments. Despite the high temperatures of up to 300° C., the colourants remain in the polyester melt without decomposing even for a prolonged period of time, which indicates high thermostability.

The suitability of the colourants of the present invention for colouring linear polyesters in the melt is surprising, as 1-amino-4-benzoylaminoanthraquinone, which has been proposed in German Pat. No. 1 212 936 for colouring aromatic polyesters from an aqueous dispersion, rapidly decomposes in the polyester melt.

In the following Examples parts and percentages are by weight unless otherwise indicated.

EXAMPLE 1

Non-delustred polyethylene terephthalate granules suitable for fibre manufacture are shaken for 15 minutes on a mechanical shaker with 1% of 1-amino-2-bromo-4-benzoylaminoanthraquinone. The uniformly coloured particles are then spun in a melt spinning machine (285° C.±3° C., sojourn time in the spinning machine about 5 minutes) to filaments, which are stretched and wound on a draw twister. On account of the solubility of the colourant in polyester terephthalate, the resulting reddish violet colouration is distinguished by excellent lightfastness, exemplary fastness to washing, dry cleaning, cross dyeing, sublimation and rubbing after thermofixation, as well as by excellent resistance to chlorite bleaching and by good fibre viscosity values.

EXAMPLE 2

The procedure of Example 1 is repeated using 1-amino-2-chloro-instead of 1-amino-2-bromo-4-benzoylaminoanthraquinone. The resulting reddish violet colouration has a somewhat more yellowish hue compared with that obtained in Example 1.

EXAMPLE 3

1000 parts of polyethylene terephthalate granules, 10 parts of titanium dioxide (Kronos RN 40) and 1 part of finely dispersed 1-amino-2-bromo-4-benzoylaminoanthraquinone are mixed in a closed vessel for 2 hours on a roller block. The coloured granules are extruded at about 260° C. to filaments of 2 mm, which are reprocessed to granules. The resulting granules are moulded in a screw injection moulding machine at 270° C.–280° C. to mouldings. Reddish violet mouldings of very good lightfastness are obtained.

A dirty grey colouration is obtained using 1-amino-4-benzoylaminoanthraquinone instead of 1-amino-2-bromo-4-benzoylaminoanthraquinone because of the decomposition of the colourant.

EXAMPLES 4 TO 24

The following colourants also colour polyester in the melt in reddish violet to violet shades of very good fastness properties by carrying out the procedures described in Examples 1 to 3:

4   1-amino-2-bromo-4-(2'-fluorobenzoylamino)-anthraquinone
5   1-amino-2-bromo-4-(3'-chlorobenzoylamino)-anthraquinone
6   1-amino-2-bromo-4-(4'-chlorobenzoylamino)-anthraquinone
7   1-amino-2-chloro-4-(2'-fluorobenzoylamino)-anthraquinone
8   1-amino-2-chloro-4-(3'-chlorobenzoylamono)-anthraquinone
9   1-amino-2-chloro-4-(4'-chlorobenzoylamino)-anthraquinone
10  1-amino-2-bromo-4-(2'-chlorobenzoylamino)-anthraquinone
11  1-amino-2-chloro-4-(2'-chlorobenzoylamino)-anthraquinone
12  1-amino-2-bromo-4-(2'-methoxybenzoylamino)-anthraquinone
13  1-amino-2-chloro-4-(2'-methoxybenzoylamino)-anthraquinone 14  1-amino-2-bromo-4-(2'-phenoxybenzoylamino)-anthraquinone 15  1-amino-2-chloro-4-(2'-phenoxybenzoylamino)-anthraquinone 16  1-amino-2-bromo-4-(2',5'-dichlorbenzoylamino)-anthraquinone 17  1-amino-2-chloro-4-(4'-methylbenzoylamino)-anthraquinone 18  1-amino-2-bromo-4-(4'-methylbenzoylamino)-anthraquinone 19  1-amino-2-chloro-4-(4'-t-butylbenzoylamino)-anthraquinone 20  1-amino-2-bromo-4-(4'-t-butylbenzoylamino)-anthraquinone 21  1-amino-2-bromo-4-(4'-phenylbenzoylamino)-anthraquinone 22  1-amino-2-chloro-4-(4'-methoxycarbonylbenzoylamino)-anthraquinone 23  1-amino-2-bromo-4-(4'-methoxycarbonylbenzoylamino)-anthraquinone 24  1-amino-2-bromo-4-(3',5'-dichlorobenzoylamino)-anthraquinone

EXAMPLE 25

With stirring, 85.5 parts of 1-amino-4-benzoylaminoanthraquinone are suspended in 200 parts of nitrobenzene. The suspension is diluted with 100 parts of water and then a solution of 50.4 parts of bromine in 60 parts of nitrobenzene is added in the course of 1 hour at 30°–35° C. The reaction is brought to completion by stirring for 3 hours at 50°–55° C. The mixture is cooled to 30°–35° C. and, after addition of 65 parts of a 40% sodium hydrogen sulfite solution, stirred for ½ hour and cooled to 20° C. Finally, the reaction product is collected by suction, washed with 60 parts of nitrobenzene as well as with ethanol and hot water, and dried, affording 91 parts (86.5% of theory) of 1-amino-2-bromo-4-benzoylaminoanthraquinone with a melting point of 241° C.–243° C. Br: calculated 18.97%, found 18.5%.

What is claimed is:

1. A process for colouring organic material of high molecular weight in the melt, which comprises homogeneously mixing said organic material with a colourant of the formula

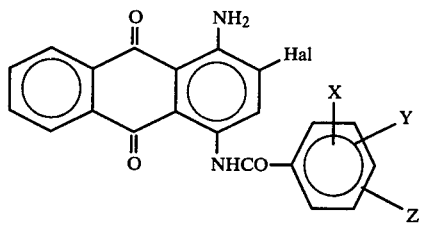

wherein Hal represents a chlorine or bromine atom, X represents a hydrogen or halogen atom, an alkyl or alkoxy group of 1 to 6 carbon atoms, an alkoxycarbonyl group of 2 to 7 carbon atoms, a phenyl group or a phenoxy group which is unsubstituted or substituted by chlorine atoms or methyl groups, and Y and Z represent hydrogen or halogen atoms or methyl groups.

2. The process according to claim 1, wherein said colourant corresponds to the formula

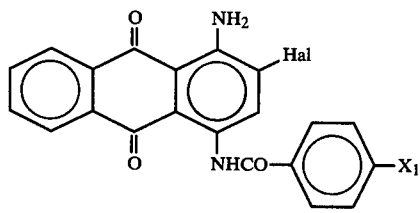

wherein Hal represents a chlorine or bromine atom and $X_1$ represents a hydrogen or chlorine atom.

3. The process according to claim 1, wherein in said colourant Hal represents a bromine atom.

4. The process according to claim 1, wherein said colourant is 1-amino-2-bromo 4-benzoylaminoanthraquinone.

5. The process according to claim 1, wherein said colourant is 1-amino-2-chloro-4-benzoylaminoanthraquinone.

6. The process according to claim 1, wherein said colourant is 1-amino-2-bromo-4-p-chlorobenzoylaminoanthraquinone.

7. The process according to claim 1, wherein said colourant is 1-amino-2-chloro-4-p-chlorobenxoylaminoanthraquinone.

8. The process according to claim 1, wherein the organic material of high molecular weight is a thermoplastic.

9. The process according to claim 1, wherein the organic material of high molecular weight is a linear polyester.

10. Organic material of high molecular weight containing a colourant according to claim 1.

11. A thermoplastic containing a colourant according to claim 1.

12. A linear polyester containing a colourant according to claim 1.

* * * * *